(No Model.)

E. FEHR.
LIQUID COOLER.

No. 468,647. Patented Feb. 9, 1892.

Witnesses
William L. Miller
Edward Wolff.

Inventor
Ernst Fehr
by Van Santvoord & Hauff
his attorneys.

THE NORRIS PETERS CO., PHOTO-LITHO., WASHINGTON, D. C.

UNITED STATES PATENT OFFICE.

ERNST FEHR, OF LUCERNE, SWITZERLAND.

LIQUID-COOLER.

SPECIFICATION forming part of Letters Patent No. 468,647, dated February 9, 1892.

Application filed September 10, 1891. Serial No. 405,305. (No model.)

*To all whom it may concern:*

Be it known that I, ERNST FEHR, a citizen of Switzerland, residing at Lucerne, in the Canton of Lucerne, in the Republic of Switzerland, have invented new and useful Improvements in Liquid-Coolers, of which the following is a specification.

This invention relates to a rotary-funnel cooler, which by its rotary motion offers to the fluid to be cooled and which enters the funnel a large cooling-surface, since the rotation is communicated to the fluid so that the latter flows off spirally along the funnel wall or side. This apparatus is illustrated in the annexed drawings, in which—

Figure 1:
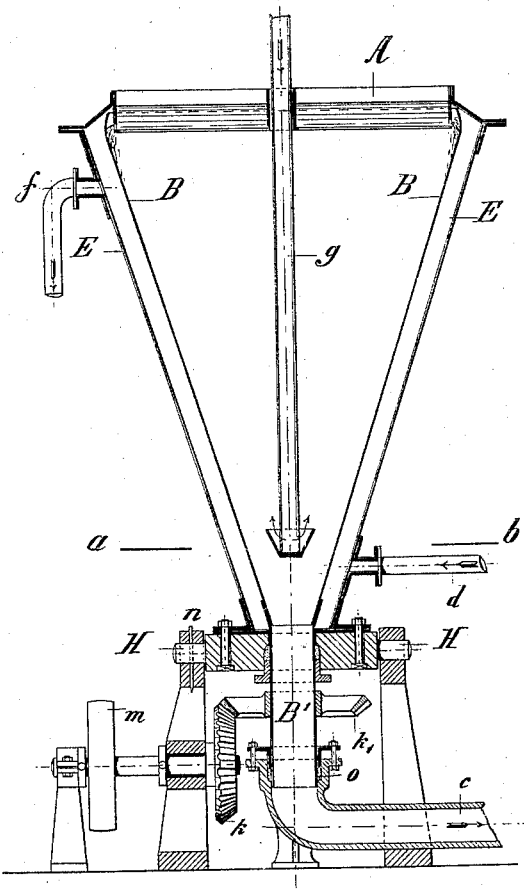
Figure 2:
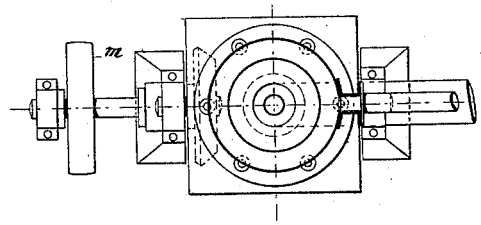

Figure 1 is a cross-section of an apparatus containing my invention. Fig. 2 is a section along $a\,b$, Fig. 1.

The fluid to be cooled—as, for example, beer-wort—flows from the distributer A through its perforated lower part into the funnel B and off through the discharge $c$. The cooling-water enters at inlet $d$ into the space between funnel B and funnel-jacket E and passes off through outlet $f$. Simultaneously with the cooling-water the apparatus is supplied near the funnel-outlet with cold purified air by means of the tube $g$, the object of the air being to cool the fluid from the interior, to saturate the beer-wort with oxygen, and to carry off above the fumes generated in the funnel. While the cold water rising up strikes the funnel until it passes off through outlet $f$, the thin layer of beer-wort flows downward while rotating—that is, in a spiral movement. Furthermore, by means of the cold air forced into the interior of the funnel through tube $g$, and which is warmed as it rises, the beer-wort flowing off is supplied with oxygen and is also cooled, so that in connection with the simultaneous exterior cooling-water a thorough cooling is attained.

The apparatus is supported by shaft K so that it can be turned or laid over for ready cleaning. The gear-wheels $k\,k'$ and pulley $m$ rotate the funnel. The lower cylindrically-formed end $B'$ of the funnel B extends into a stuffing-box $o$ of the discharge-tube $c$, said stuffing-box securing the requisite tight joint, but allowing the funnel-tube $B'$ to turn in tube $c$. The peg $n$ serves to hold the apparatus in its vertical position.

What I claim as new, and desire to secure by Letters Patent, is—

1. In a liquid-cooler, the combination, with a rotary funnel having a discharge at its lower end and means for delivering the liquid to be cooled to the inner side of the funnel at its upper end portion, of a cooling-jacket surrounding the funnel and means for introducing the cooling medium into the space between the jacket and the funnel, substantially as described.

2. In a liquid-cooler, the combination, with a rotary funnel having a discharge at its lower end portion and means for delivering the liquid to be cooled to the inner side of the funnel at its upper end portion, of an air-forcing tube located in the funnel, a cooling-jacket surrounding the funnel, and means for introducing the cooling medium between the funnel and the jacket, substantially as described.

In testimony whereof I have hereunto set my hand in the presence of two subscribing witnesses.

ERNST FEHR.

Witnesses:
 H. HEIMBERGER,
 F. R. METZER.